(12) United States Patent
Uozumi et al.

(10) Patent No.: US 12,050,096 B2
(45) Date of Patent: Jul. 30, 2024

(54) DISPLACEMENT METER AND ARTICLE MANUFACTURING METHOD

(71) Applicant: CANON KABUSHIKI KAISHA, Tokyo (JP)

(72) Inventors: Takayuki Uozumi, Tochigi (JP); Kazuyuki Kuratomi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 17/736,281

(22) Filed: May 4, 2022

(65) Prior Publication Data

US 2023/0029274 A1 Jan. 26, 2023

(30) Foreign Application Priority Data

Apr. 28, 2021 (JP) ................................. 2021-076746

(51) Int. Cl.
*G01B 11/26* (2006.01)
*G01B 11/02* (2006.01)
(Continued)

(52) U.S. Cl.
CPC ............ *G01B 11/026* (2013.01); *G02B 13/22* (2013.01); *G06T 7/248* (2017.01); *H04N 23/56* (2023.01);
(Continued)

(58) Field of Classification Search
CPC ...................... G06T 7/0012; G06T 7/32; G06T 2207/10132; G06T 2207/20056; G06T 5/70; G06T 7/20; G06T 7/30; G06T 7/74; G06T 11/003; G06T 5/50; G06T 2207/10016; G06T 7/521; G06T 2207/10088; G06T 7/262; G06T 2207/10101; G06T 7/246; G06T 2207/10012; G06T 7/00;
(Continued)

(56) References Cited

U.S. PATENT DOCUMENTS

2018/0114327 A1* 4/2018 Ikemoto .................. G06T 7/593
2019/0297295 A1* 9/2019 Roberts .................. H04N 25/77

FOREIGN PATENT DOCUMENTS

CN 1695166 A * 11/2005 ............. G06T 5/002
JP S5952963 A 3/1984
(Continued)

*Primary Examiner* — Michael P Stafira
(74) *Attorney, Agent, or Firm* — Canon U.S.A., Inc., IP Division

(57) ABSTRACT

A displacement meter that measures displacement of an object includes a calculation circuit which calculates a displacement amount of the object using a cross-correlation function of plural images detected at different timings by a photoelectric conversion element array. The calculation circuit performs a Fourier transform on the images, applies a band-pass filter to the images having undergone the Fourier transform, and calculates the cross-correlation function using the images to which the band-pass filter has been applied. Assuming that a magnification of a light-receiving optical assembly is M, the number of pixels in the photoelectric conversion element array is N, and a pixel pitch is P (um), a low cut-off frequency HPF of the band-pass filter and a high cut-off frequency LPF of the band-pass filter satisfy: $3M/(N\times P) \leq HPF \leq 10M/(N\times P)$, $40M/(N\times P) \leq LPF \leq 60M/(N\times P)$.

9 Claims, 10 Drawing Sheets

(51) Int. Cl.
*G02B 13/22* (2006.01)
*G06T 7/246* (2017.01)
*H04N 23/56* (2023.01)

(52) U.S. Cl.
CPC .............. *G06T 2207/20056* (2013.01); *G06T 2207/30108* (2013.01)

(58) Field of Classification Search
CPC . G06T 2207/20221; G06T 2207/30096; G06T 7/37; G06T 7/248; G06T 2207/10056; G06T 2207/30024; G06T 2207/30181; G06T 7/0002; G06T 11/006; G06T 2207/20081; G06T 7/001; G06T 2207/30004; G06T 7/593; G06T 2207/10032; G06T 2207/20021; G06T 2207/30048; G06T 2211/421; G06T 7/70; G06T 7/73; G06T 2207/20016; G06T 7/0016; G06T 2207/10024; G06T 2207/10064; G06T 2207/20032; G06T 2207/30041; G06T 5/80; G06T 2207/10116; G06T 2207/30101; G06T 7/33; G06T 7/80; G06T 7/97; G06T 19/006; G06T 2207/20228; G06T 2207/30108; G06T 2207/30244; G06T 3/147; G06T 7/55; G06T 7/557; G06T 1/005; G06T 2207/20084; G06T 2207/30148; G06T 2207/30164; G06T 2207/30204; G06T 3/10; G06T 7/285; G06T 7/50; G06T 7/66; G06T 1/0064; G06T 11/00; G06T 11/60; G06T 2207/10028; G06T 2207/10061; G06T 2207/20064; G06T 2207/20201; G06T 2207/20224; G06T 2207/30068; G06T 2207/30152; G06T 2207/30196; G06T 3/4053; G06T 5/73; G06T 7/0004; G06T 7/136; G06T 7/215; G06T 7/269; G06T 7/40; G06T 7/571; G06T 7/60; G06T 1/00; G06T 1/0028; G06T 1/20; G06T 11/005; G06T 17/20; G06T 2201/0052; G06T 2201/0083; G06T 2201/0202; G06T 2207/10044; G06T 2207/10081; G06T 2207/20004; G06T 2207/20024; G06T 2211/428; G06T 3/00; G06T 3/4084; G06T 5/10; G06T 7/11; G06T 7/13; G06T 7/207; G06T 7/223; G06T 7/35; G06T 7/62; G06T 1/0021; G06T 11/001; G06T 11/008; G06T 2200/24; G06T 2201/0051; G06T 2201/0061; G06T 2207/10004; G06T 2207/10048; G06T 2207/10072; G06T 2207/10104; G06T 2207/10152; G06T 2207/20048; G06T 2207/20104; G06T 3/14; G06T 3/40; G06T 3/60; G06T 5/00; G06T 5/20; G06T 7/0014; G06T 7/168; G06T 7/277; G06T 7/337; G06T 15/00; G06T 17/05; G06T 2201/0065; G06T 2207/10008; G06T 2207/10021; G06T 2207/10144; G06T 2207/10148; G06T 2207/20028; G06T 2207/20052; G06T 2207/20182; G06T 2207/30104; G06T 2207/30136; G06T 2207/30144; G06T 2207/30168; G06T 2207/30192; G06T 2211/412; G06T 3/18; G06T 5/40; G06T 5/60; G06T 5/77; G06T 7/12; G06T 7/251; G06T 7/254; G06T 7/579; G06T 7/90; G06T 9/004; G06T 9/005; G06T 9/007; G06T 1/0057; G06T 2200/28; G06T 2207/20072; G06T 2207/20076; G06T 2207/20164; G06T 2207/30124; G06T 2207/30176; G06T 2207/30184; G06T 2207/30208; G06T 2207/30241; G06T 2210/04; G06T 3/20; G06T 3/0438; G06T 3/4046; G06T 3/608; G06T 5/90; G06T 7/10; G06T 7/143; G06T 7/174; G06T 7/292; G06T 7/38; G06T 9/00; G06T 9/40; G01B 11/25; G01B 11/2441; G01B 11/2513; G01B 11/02; G01B 9/02041; G01B 9/02058; G01B 9/02084; G01B 9/0209; G01B 11/026; G01B 11/24; G01B 11/16; G01B 11/162; G01B 11/26; G01B 2210/52; G01B 5/0004; G01B 9/02004; G01B 9/02039; G01B 9/02091; G01B 11/00; G01B 11/002; G01B 11/2545; G01B 9/02001; G01B 9/02044; G01B 11/22; G01B 9/02067; G01B 9/02072; G01B 9/02076; G01B 9/02077; G01B 9/02083; G01B 9/04; G01B 21/367; G01B 7/34; G01B 21/34; G01B 7/09; G01B 21/365; G01B 5/18; G01B 7/28; G01B 27/0075; G01B 7/285; G01B 7/365; G01B 27/46; G01B 21/025; G01B 21/08; G01B 21/16; G01B 21/18; G01B 21/22; G01B 21/361; G01B 5/1876; G01B 13/22; G01B 27/02; G01B 5/30; G01B 2027/0138; G01B 2027/014; G01B 2027/0178; G01B 21/02; G01B 21/06; G01B 21/245; G01B 21/26; G01B 21/36; G01B 23/00; G01B 26/0833; G01B 27/0093; G01B 27/0172; G01B 3/0056; G01B 5/1814; G01B 5/1885; G01B 6/403; G01B 7/36; G01B 13/18; G01B 21/0076; G01B 21/244; G01B 26/101; G01B 27/642; G01B 6/241; G01B 6/36; G01B 6/3624; G01B 6/3851; G01B 6/4215; G01B 6/4292; G01B 7/38

See application file for complete search history.

(56) References Cited

FOREIGN PATENT DOCUMENTS

| | | | | |
|---|---|---|---|---|
| JP | H10503279 | A | * | 3/1998 |
| JP | 2016035420 | A | | 3/2016 |
| JP | 2017142195 | A | | 8/2017 |
| JP | 2020134356 | A | * | 8/2020 |

* cited by examiner

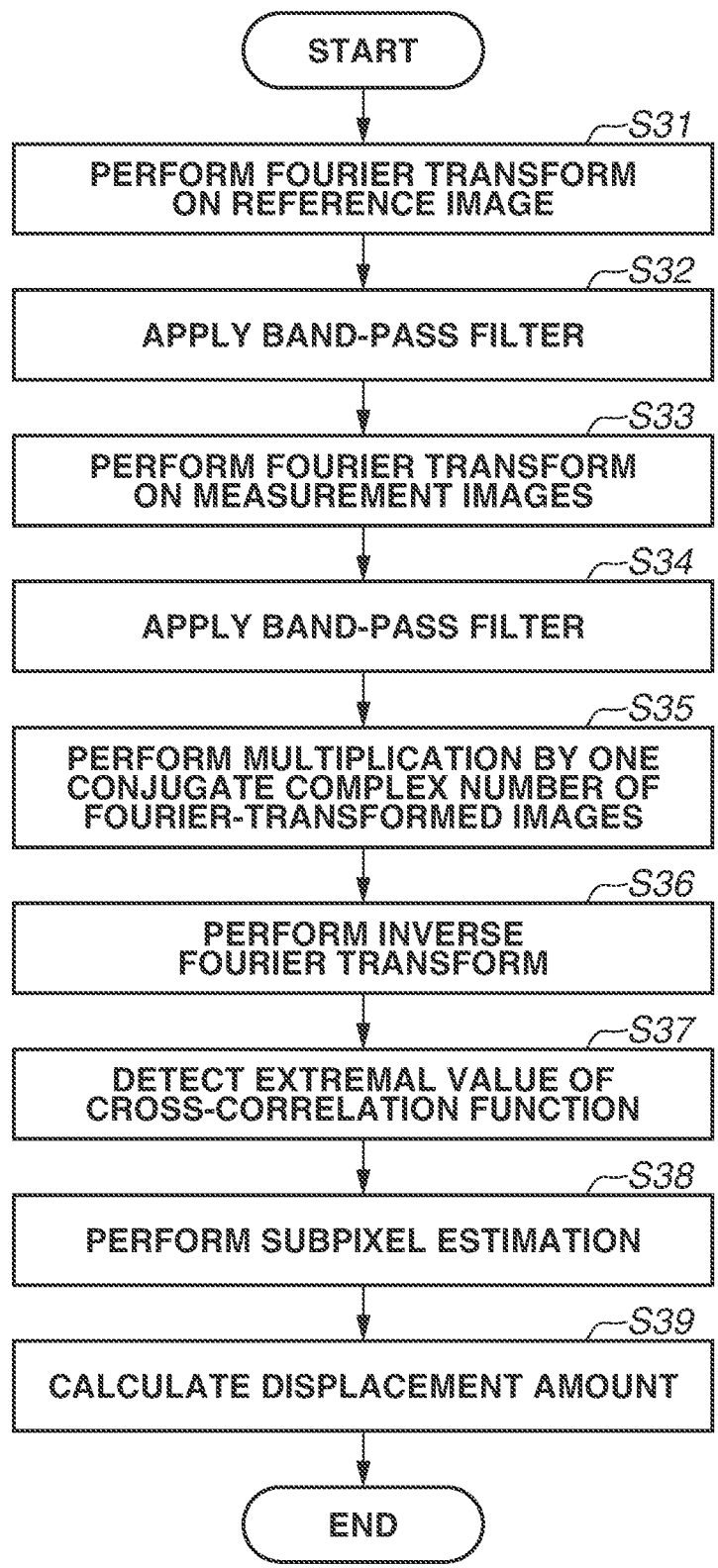

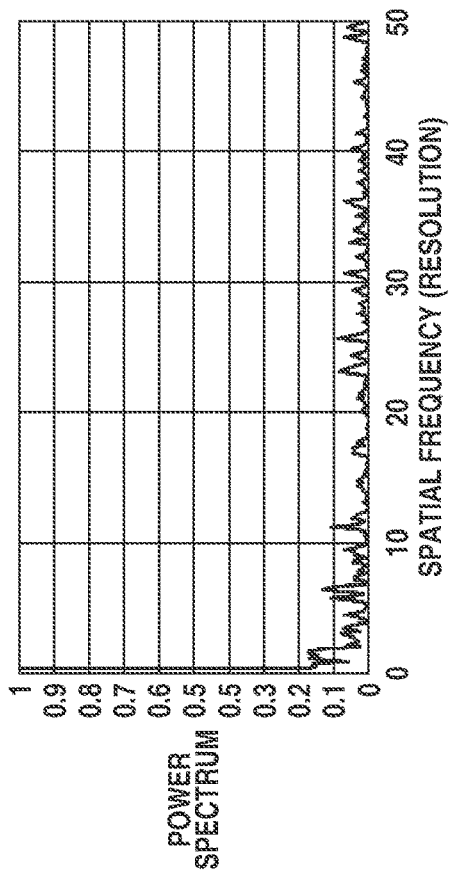
FIG.5A
FIG.5B
FIG.5D
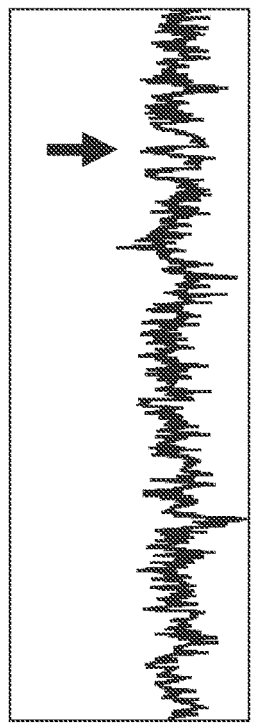
FIG.5C
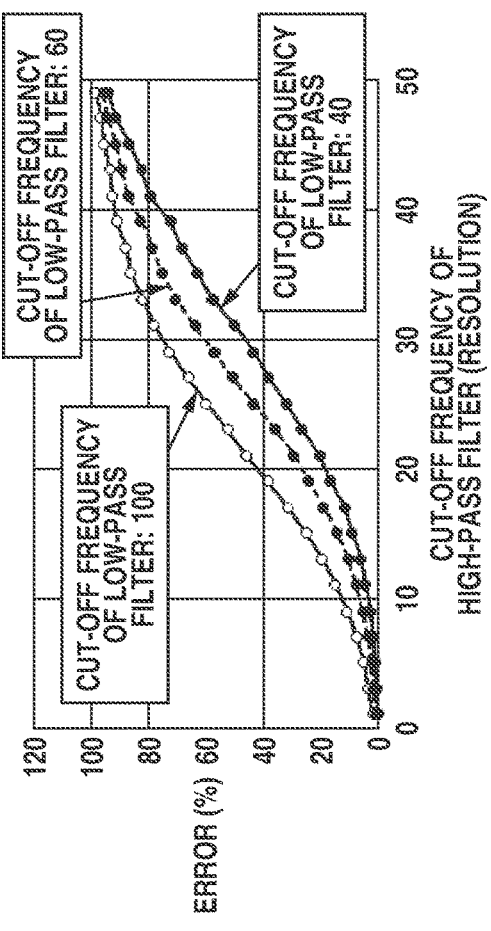
FIG.5E

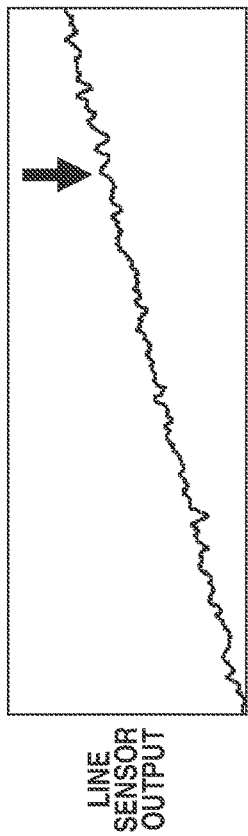
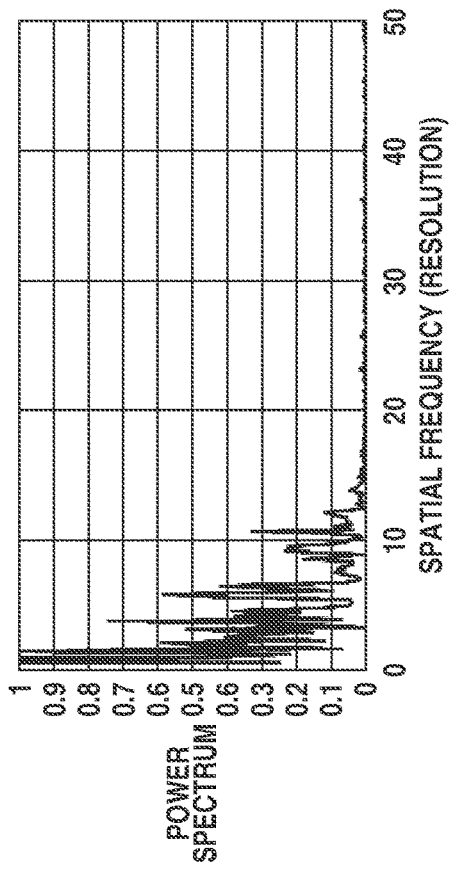
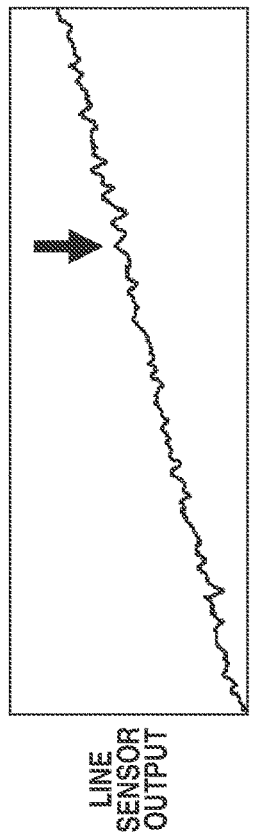
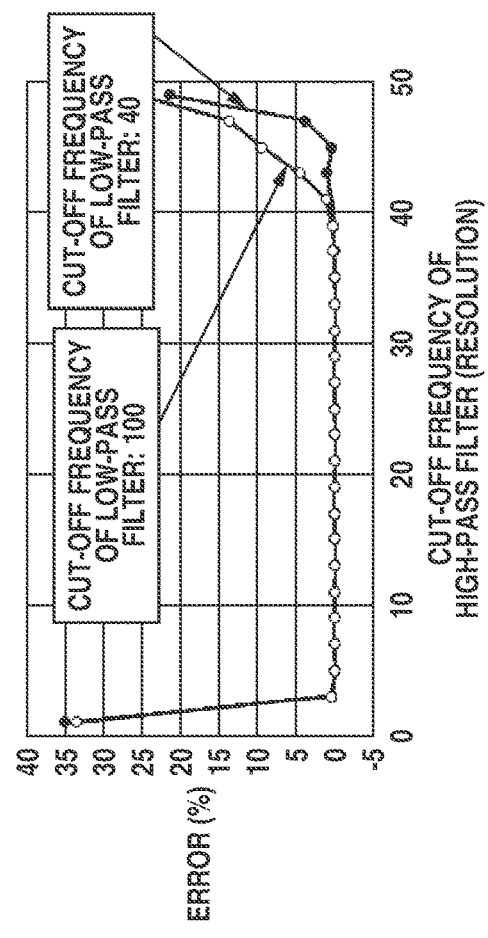
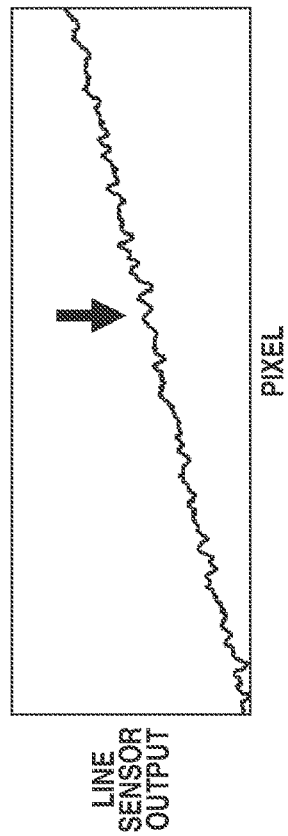

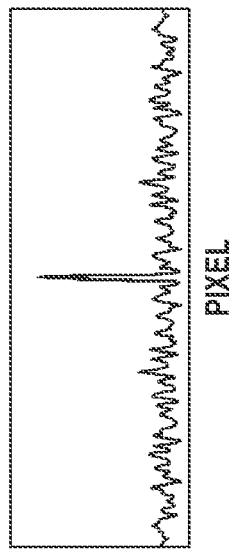
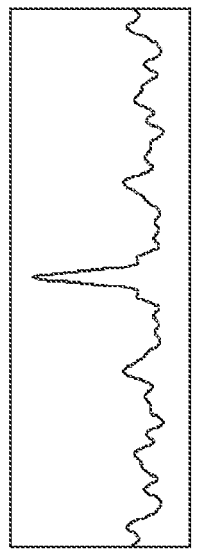
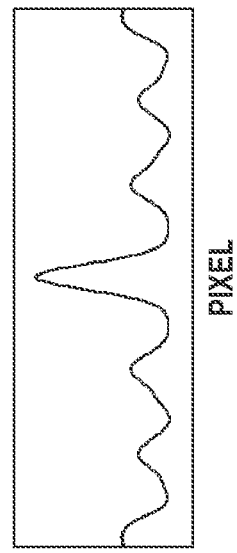
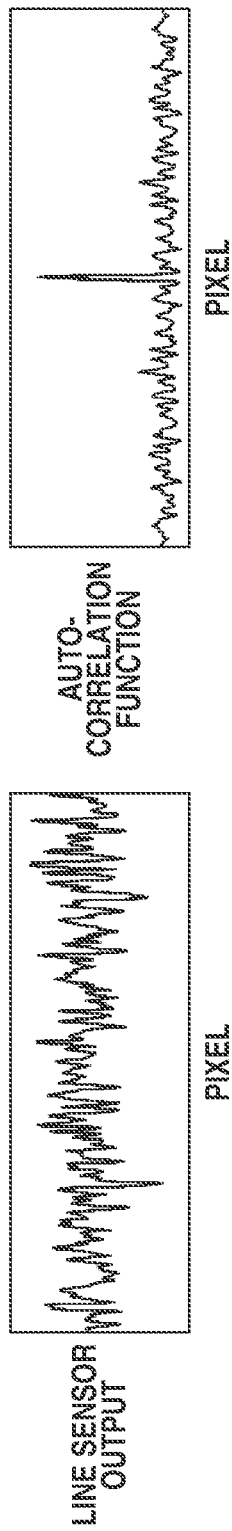
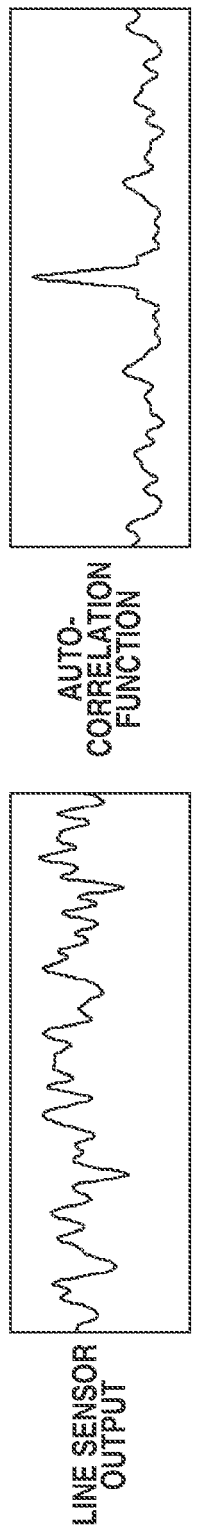
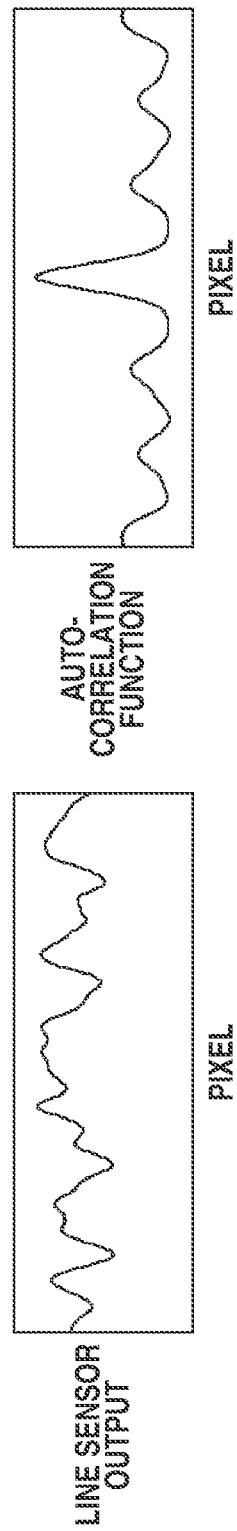

DISPLACEMENT METER AND ARTICLE MANUFACTURING METHOD

BACKGROUND

Technical Field

One disclosed aspect of the embodiments relates to a displacement meter and an article manufacturing method.

Description of the Related Art

As methods for measuring displacement in an in-plane direction in a contactless manner, there are known a laser Doppler method, a spatial filter method, a laser speckle method, an image correlation method by which displacement is calculated from image correlation, and the like. The image correlation method makes it possible to determine a stationary state and a movement direction, and can be implemented at relatively low cost by using an image sensor having significantly become widespread in recent years.

The displacement meter discussed in Japanese Examined Patent Application Publication No. S59-52963 irradiates a measurement target object with laser light to generate speckles, subjects speckle distributions before and after displacement to photoelectric conversion, and measures the displacement from an extremal value of a cross-correlation function between signals obtained by the photoelectric conversion, thereby measuring an amount of an in-plane movement of the measurement target object.

Japanese Patent Application Laid-Open No. 2016-35420 discusses a method for stable measurement to adjust a frame rate of an imaging element, an exposure time, and a light-emitting power of a light-emitting element in accordance with a movement speed of a measurement target object.

Japanese Patent Application Laid-Open No. 2017-142195 discusses that, at the time of calculation of a cross-correlation function, a low-pass filter is applied to an imaged pattern and a cut-off frequency is determined according to a convexo-concave pitch on a surface of a measurement target object.

There is a filter that is used to calculate, as measurement parameters of a displacement meter, for example, the frame rate of an imaging element, the exposure time, and the cross-correlation function. Japanese Patent Application Laid-Open No. 2016-35420 discusses that measurement parameters are adjusted based on actual measurement data under certain conditions. However, the measurement parameters are applicable only to limited measurement target objects and measurement conditions.

Japanese Patent Application Laid-Open No. 2017-142195 discusses that a cut-off frequency of a low-pass filter is determined according to a type of paper specified by a user or preliminary measurement for identifying the type of paper. However, the optimum cut-off frequency cannot be selected for measurement target objects other than paper or measurement target objects with a combination of different surface properties.

SUMMARY

According to an aspect of the present disclosure, a displacement meter configured to measure displacement of a measurement target object includes an illumination assembly, a photoelectric conversion element array, a light-receiving optical assembly, and a calculation circuit. The illumination assembly is configured to illuminate the measurement target object. The photoelectric conversion element array is configured to detect reflected light from the measurement target object. The light-receiving optical assembly is configured to condense light on the photoelectric conversion element array. The calculation circuit is configured to calculate a displacement amount of the measurement target object, using a cross-correlation function of a plurality of images detected at different timings by the photoelectric conversion element array. The calculation circuit performs a Fourier transform on the images, applies a band-pass filter to the images having undergone the Fourier transform, and calculates the cross-correlation function using the images to which the band-pass filter has been applied. Assuming that a magnification of the light-receiving optical system is M, the number of pixels in the photoelectric conversion element array is N, and a pixel pitch is P (um), a low cut-off frequency HPF of the band-pass filter and a high cut-off frequency LPF of the band-pass filter satisfy: $3M/(N \times P) \leq HPF \leq 10M/(N \times P)$, $40M/(N \times P) \leq LPF \leq 60M/(N \times P)$.

Further features of the disclosure will become apparent from the following description of exemplary embodiments with reference to the attached drawings.

BRIEF DESCRIPTION OF THE DRAWINGS

FIG. 3 is a flowchart illustrating a displacement amount calculation method.

FIGS. 5A, 5B, 5C, 5D, and 5E are diagrams illustrating signal processing results at a measurement of low-reflectivity samples.

FIGS. 6A, 6B, 6C, 6D, and 6E are diagrams illustrating signal processing results at a measurement of perfect-diffusion samples.

FIGS. 8A, 8B-1, 8B-2, 8C-1, 8C-2, 8D-1, and 8D-2 are diagrams each illustrating a relationship between signal profile and measurement accuracy.

DESCRIPTION OF THE EMBODIMENTS

Hereinafter, exemplary embodiments of the present disclosure will be described in detail with reference to the accompanying drawings. In the following, the term "unit" may be used to refer to a circuit, a subsystem, a module, a functional block, a logic device, a physical device, a processor, or hardware elements. It may include mechanical, optical, or electrical components, or any combination of them. It may include active (e.g., transistors) or passive (e.g., capacitors) components. It may include one or more programmable processors, such as a central processing unit (CPU) or a microprocessor, that are configured to execute instructions or programs stored in one or more memory devices to perform specified operations. It may include logic elements such as AND-OR, and NOT elements implemented by transistor circuits or any other switching circuits. Typical combinational logic functions may be implemented by switching circuits such as multiplexers (to implement select functions), encoders, and decoders.

Figure 1:
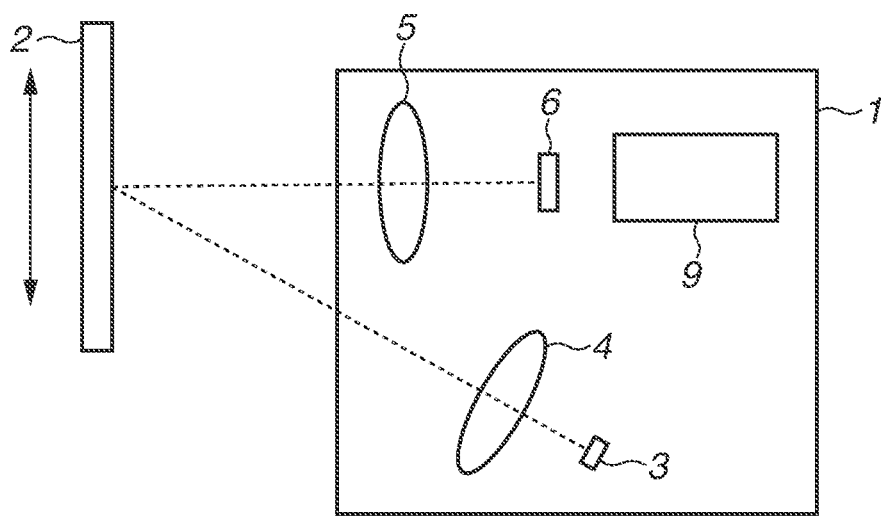
FIG. 1 is a diagram illustrating a configuration of a displacement meter according to a first exemplary embodiment.

FIG. 1 is a schematic diagram of a displacement meter (length meter) according to a first exemplary embodiment. In relation to the present exemplary embodiment, a contactless in-plane displacement meter will be described as a displacement meter. A displacement meter 1 in the present exemplary embodiment measures displacement of an object 2 that is a measurement target object arranged to face the displacement meter 1 and moving in arrow directions in the diagram.

A light beam emitted from a light source 3 is condensed on the object 2 by a light-condensing member 4 to illuminate the object 2. The light source 3 is controlled by a control unit or circuit 9. The light source 3 is a laser diode, a light-emitting diode (LED), a halogen lamp, or the like. When a laser diode that is a coherent light source is selected, a speckled image is obtained. When an LED or a halogen lamp that is an incoherent light source is selected, an image reflecting a pattern on a surface of the object 2 is obtained. The light-condensing member 4 includes a single lens element or a lens unit. In the case of using a laser diode, it is desired to select the laser diode based on the premise that aberration correction is performed to condense light in a plane wave. In the case of selecting an LED or a halogen lamp, it is just necessary that the light-receiving area is illuminated, and thus aberration is not particularly significant. The type of the light source 3 can be selected as appropriate according to the size of the area to be illuminated.

A part of the reflection light diffused and reflected by the object 2 is condensed on a sensor 6 via a light-receiving optical system of a light-condensing member 5. The light-receiving optical system is an object-side telecentric optical system. The light-condensing member 5 includes a single lens element or a lens unit and is selectable as appropriate according to the resolution of the light-receiving optical system. The sensor 6 includes an array of photoelectric conversion elements such as charge-coupled device (CCD) elements, complementary metal oxide semiconductor (CMOS) elements, or a line sensor. In a case where a two-dimensional area sensor is selected as the sensor 6, the sensor 6 can detect two-dimensional displacement, while in a case where a line sensor is selected as the sensor 6, the sensor 6 can detect one-dimensional displacement. The photoelectric conversion element array is a circuit that includes an group of a photoelectric conversion elements arranged in a predetermined geometrical pattern such as a linear array, a two-dimensional array, or any suitable pattern.

A magnification of the light-receiving optical system can be determined from a distance between the object 2 and the light-condensing member 5, a focal length of the single lens element or lens unit or device/component used for the light-condensing member 5, and the position of the sensor 6. A conversion length of pixel as a reference for measurement, that is, resolution is determined from the magnification of the light-receiving optical system and the size of the pixels constituting the sensor 6.

The light beam having formed an image on the sensor 6 is subjected to photoelectric conversion and then output to a signal processing unit or circuit (calculation unit or circuit) of the control unit or circuit 9. The signal processing unit includes a processor of a field-programmable gate array (FPGA) or a microcomputer and processes an image output from the sensor 6 to calculate a displacement amount of the object 2.

Figure 2:
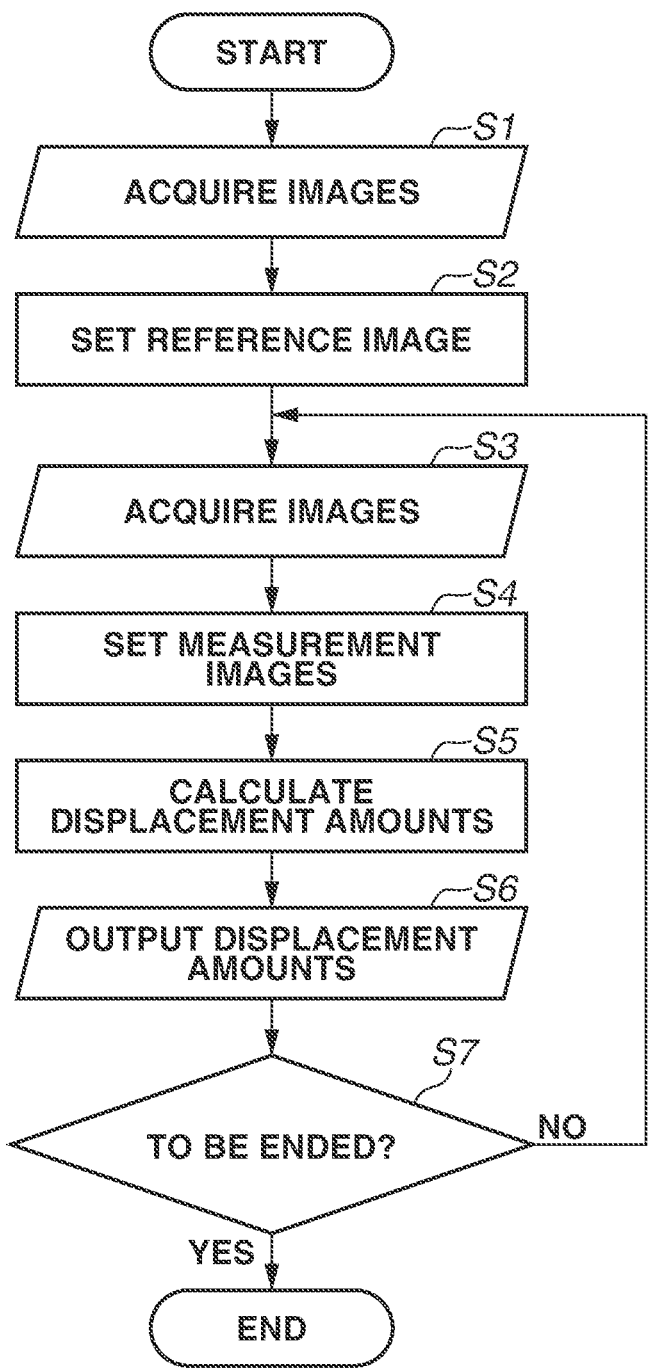
FIG. 2 is a flowchart illustrating a signal processing method executed by the displacement meter.

FIG. 2 is a flowchart illustrating a signal processing method executed by the signal processing unit. In steps S1 and S3, along with the start of measurement, the displacement meter 1 acquires images in sequence by the sensor 6 at a preset sampling rate. In step S2, the signal processing unit sets the initially obtained image as a reference image. In step S4, the signal processing unit sets the sequentially obtained images as measurement images. In step 5, the signal processing unit calculates the amounts of displacement in sequence. Then, in step S6, the signal processing unit outputs the calculated amounts of displacement to the outside of the displacement meter 1. In step S7, the signal processing unit determines whether to end the measurement. In a case of determining that the measurement is not to end (NO in step S7), the processing returns to step S3. If the reference image becomes out of the measurement area with the progress of the sampling, a countermeasure is taken such as updating the reference image.

FIG. 3 is a flowchart specifically illustrating a process of calculating the amounts of displacement in step S5.

The signal processing unit calculates the amounts of displacement using a cross-correlation function of the reference image and the measurement images, which constitute a plurality of images detected at different timings by the photoelectric conversion element array. The cross-correlation function is generally calculated in a frequency space. Thus, first, in steps S31 and S33, the signal processing unit performs Fourier transform on the reference image and measurement images to be used for calculation. Then, in steps S32 and S34, the signal processing unit applies a band-pass filter to the images having undergone Fourier transform.

Next, the signal processing unit uses the images to which the band-pass filter has been applied and calculates a cross-correlation function. The band-pass filter can be applied by setting transmission/non-transmission of each frequency component for the data having undergone Fourier transform. A window function is applicable at the execution of Fourier transform. In the present exemplary embodiment, a Hamming window is applied. In step S35, the signal processing unit performs a multiplication by one conjugate complex number of the images having undergone Fourier transform. In step S36, the signal processing unit performs inverse Fourier transform to obtain a cross-correlation function.

Next, the signal processing unit determines the amount of displacement from the position of an extremal value of the cross-correlation function. In step S37, the signal processing unit detects the extremal value or the highest value (peak) of the cross-correlation function. The extremal value of the cross-correlation function can be determined in the units of pixel. In the case of aiming at high accuracy, in step S38, the signal processing unit uses sub-pixel estimation to calculate the extremal value with a resolution equivalent to or smaller than one pixel. In the sub-pixel estimation, the extremal value and its preceding and following values of the cross-correlation function are functionally approximated and the extremal value of the approximation function is given as displacement. The approximation can be performed by using, instead of a quadratic function, an intersection point of lines or a Gaussian distribution.

In step S39, the signal processing unit calculates the amount of displacement of the measurement target object based on the extremal value determined by the sub-pixel estimation.

Hereinafter, setting of the band-pass filter will be described by taking a specific example. The light-receiving optical system is configured such that the light-condensing member 5 is a single lens element with a focal length f1 (mm), and a distance between the object 2 and a principal point of the lens is A (mm) and a distance between the sensor 6 and the principal point of the lens is B (mm).

The magnification of the optical system is M (=B/A) times. If the sensor 6 is a line sensor with N pixels and a pixel pitch P (um), an effective area of the sensor 6 is N×P (um). In this case, a converted length of the effective area of the line sensor is N×P/M (um). The light source 3 is an LED. As the light-condensing member 4, a single lens element with a focal length f2 (mm) is employed, like the light-receiving optical system, to illuminate the object 2 with collimated light. The illumination state can be optimized taking the diffusion and reflection on the measurement target object and the exposure time of the sensor 6 into consideration. The light-receiving optical system or an illumination system is an optical assembly which is a collection of optical components that are integrated or combined in a structure that is configured to perform a specified optical functions.

As a setting of the sensor 6, the sampling rate of the sensor 6 is S (Hz). The sampling rate can be determined from a desired measurement frequency and available sensor performance. The sampling rate is set to a value that is about four times a desired analysis frequency. By determining the sampling rate, an upper limit of the exposure time of the sensor 6 becomes 1/S (s). As a specification of the displacement meter in the present exemplary embodiment, a measurable upper-limit speed of the measurement target object is V (mm/s). Considering that, as the amount of displacement increases in one sampling, the correlation between the reference image and the measurement image is lost to cause the measurement difficult, the amount of displacement in one sampling is desirably determined to be equal to or smaller than ¼ of a converted distance(=N×P/M) of the line sensor.

The band-pass filter can be optimally set based on simulation data of various measurement target objects. Hereinafter, as examples of measurement target objects, metal, a low-reflectivity sample, and paper exhibiting a behavior close to perfect diffusion will be taken. In the examples of FIGS. 4A to 6E, the exposure time of the sensor 6 is fixed. The following simulation results have proven to match well with experimental results.

Figure 4D:
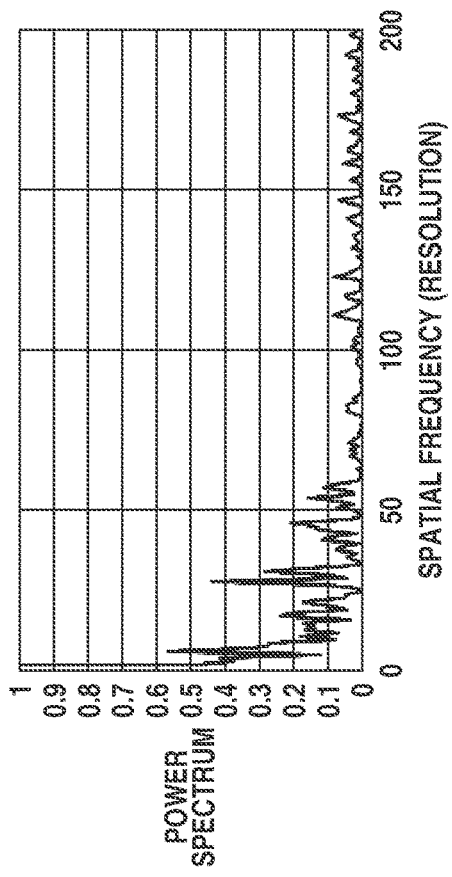
FIGS. 4A, 4B, 4C, 4D, and 4E are diagrams illustrating signal processing results at a measurement of metal samples.
Figure 4E:
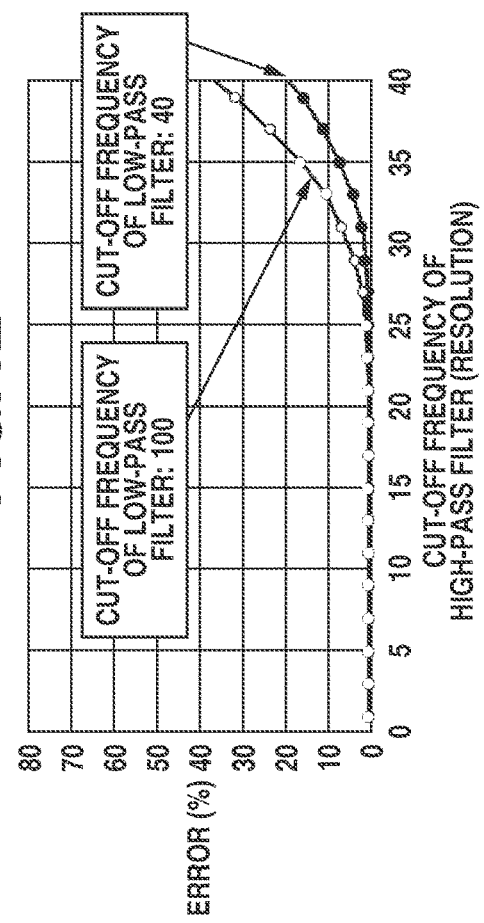
Figure 4A:
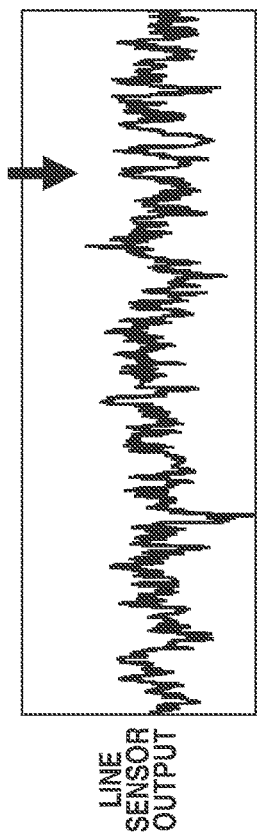
Figure 4B:
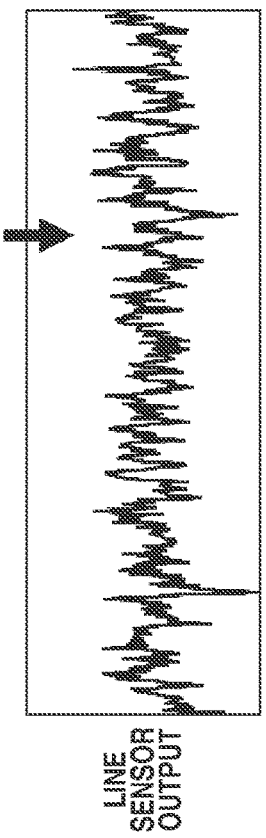
Figure 4C:
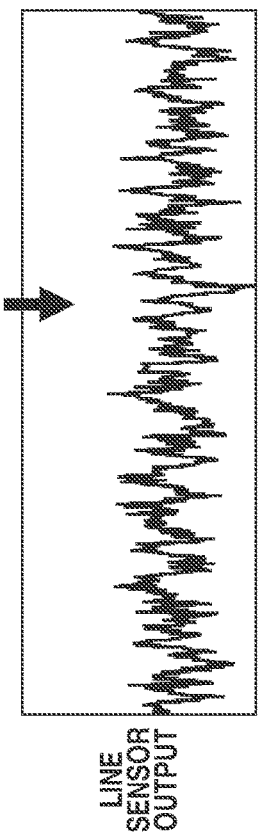

FIGS. 4A to 4E illustrate results of simulations on the assumption that the measurement target object is a Steel Use Stainless (SUS) steel sheet or a galvanized steel sheet. FIGS. 4A to 4C are diagrams illustrating line sensor outputs of three samplings. Each of the horizontal axes indicates a pixel position of the line sensor, and each of the vertical axes indicates a line sensor output value. Illustrated here are the results of the simulations with movement of the measurement target object at V1 (mm/s). The changes in the line sensor outputs are indicated by relatively characteristic waveform parts (with arrows). Since the simulations were performed in anticipation of possible noise of the line sensor, the output waveforms are not fully identical at all times. FIG. 4D illustrates a power spectrum of the line sensor output in FIG. 4A subjected to a Fourier transform. The resolution at spatial frequency is expressed as (M/P)÷N=M/(N×P) from the converted length P/M (um) of one pixel and the number N of pixels.

FIG. 4E illustrates a measurement error with changes in the cut-off frequency of a high-pass filter in a case where the cut-off frequency of a low-pass filter is set to 40 or 100. The horizontal axis indicates the cut-off frequency of the high-pass filter, and the vertical axis indicates the measurement error. The cut-off frequency of the low-pass filter is a high cut-off frequency of the band-pass filter, and the cut-off frequency of the high-pass filter is a low cut-off frequency of the band-pass filter.

In this case, the band-pass filter is set such that the changes in the cut-off frequency of the low-pass filter have a relatively small effect on measurement accuracy. On the other hand, increasing the cut-off frequency of the high-pass filter deteriorates the measurement accuracy. This result indicates that a high-frequency component has no effect on the measurement accuracy and a spatial frequency component of relatively low frequency is important for the measurement. It has been discovered from the simulation and experimental results that the measurement error can be kept at a low level by setting a cut-off frequency of the high-pass filter HPF and a cut-off frequency of the low-pass filter LPF as in the following inequalities (1):

$$HPF \leq 30M/(N \times P), 40M/(N \times P) \leq LPF \quad (1)$$

FIGS. 5A to 5E illustrate results of simulations on the assumption that a measurement target object is a low-reflectivity sample, for example, a plastic sheet (rough surface) or black anodized aluminum. FIGS. 5A to 5C are diagrams illustrating line sensor outputs of three samplings. Illustrated here are the results of the simulations with movement of the measurement target object at V1 (mm/s). The changes in the line sensor outputs are indicated by relatively characteristic waveform parts (with arrows). Since the simulations were performed in anticipation of possible noise of the line sensor, the output waveforms are not fully identical at all times. In comparison to FIGS. 4A to 4C, it can be seen that the level of contrasts has further been lowered. FIG. 5D illustrates a power spectrum of the line sensor output in FIG. 5A subjected to a Fourier transform. FIG. 5E illustrates a measurement error with changes in the cut-off frequency of a high-pass filter in a case where the cut-off frequency of a low-pass filter is set to 40, 60, or 100.

In the examples of FIGS. 5A to 5E, the band-pass filter is set such that the cut-off frequency of the low-pass filter has an effect on the measurement accuracy. In this case, as the cut-off frequency of the low-pass filter is lower, the measurement accuracy is increased. In addition, as the cut-off frequency of the high-pass filter is higher, the measurement accuracy is deteriorated. These results indicate that, when a signal-to-noise (SN) ratio of the line sensor output becomes deteriorated, the cut-off frequency of the low-pass filter needs to be set, and that the cut-off frequency of the high-pass filter needs to be set to a small value. It has been discovered from the simulation and experimental results that the measurement error can be kept at a low level by setting the cut-off frequency of the high-pass filter HPF and the cut-off frequency of the low-pass filter LPF as in the following inequalities (2):

$$HPF \leq 10M/(N \times P), 40M/(N \times P) \leq LPF \leq 60M/(N \times P) \quad (2)$$

FIGS. 6A to 6E illustrate results of simulations on the assumption that the measurement target object is a sample exhibiting a behavior close to perfect diffusion, for example, plain paper. FIGS. 6A to 6C are diagrams illustrating line sensor outputs of three samplings. The changes in the line sensor outputs are indicated by relatively characteristic waveform parts (with arrows). Since the simulations were performed in anticipation of possible noise of the line sensor, the output waveforms are not fully identical at all times. Linear offset components reflect light amount distribution due to perfect diffusion. FIG. 6D illustrates a power spectrum of the line sensor output in FIG. 6A subjected to a Fourier transform. FIG. 6E illustrates a measurement error with changes in the cut-off frequency of a high-pass filter in a case where the cut-off frequency of the low-pass filter is set to 40 or 100.

In the examples of FIGS. 6A to 6E, the band-pass filter is set such that the changes in the cut-off frequency of the low-pass filter have a relatively small effect on the measurement accuracy. This means that a high-frequency component has no great effect on the measurement accuracy. On the other hand, in the case of changing the cut-off frequency of the high-pass filter, increasing the cut-off frequency of the high-pass filter deteriorates the measurement accuracy as in the case described above. Further, decreasing the cut-off frequency of the high-pass filter too much deteriorates the measurement accuracy. This result indicates that, with a light amount distribution, setting the cut-off frequency of the high-pass filter to a value too small makes it impossible to remove a low-frequency component that may cause deterioration of the measurement accuracy. It has been discovered from the simulation and experimental results that the measurement error can be kept at a low level by setting the cut-off frequency of the high-pass filter HPF and the cut-off frequency of the low-pass filter LPF as in the following inequalities (3):

$$3M/(N \times P) \leq HPF \leq 10M/(N \times P), 40M/(N \times P) \leq LPF \quad (3)$$

As described above, at measurement of various measurement target objects, the optimum setting of the band-pass filter is different. For a metal sample with which a signal at a relatively excellent SN ratio can be obtained, there is no limitation on the cut-off frequency of the low-pass filter, and the cut-off frequency of the high-pass filter is required not to be too high. For a measurement target object at a relatively poor SN ratio such as black anodized aluminum, the cut-off frequency of the low-pass filter is required to be low, and the cut-off frequency of the high-pass filter is also required to be low. For a measurement target object that exhibits a behavior close to perfect diffusion, there is no limitation on the cut-off frequency of the low-pass filter, and the cut-off frequency of the high-pass filter is required not to be too low.

However, setting an overlapping range of the cut-off frequency in the above-described examples allows accurate measurement in any of the cases. The overlapping range in the above-described examples can be expressed by the following inequalities (4):

$$3M/(N \times P) \leq HPF \leq 10M/(N \times P), 40M/(N \times P) \leq LPF \leq 60M/(N \times P) \quad (4)$$

This setting makes it possible to remove noise components of low frequency waves and high frequency waves included in the sensor outputs, which cause deterioration of the accuracy, thereby enabling the accurate measurement of a wide variety of measurement target objects such as metals and paper.

Figure 7A:
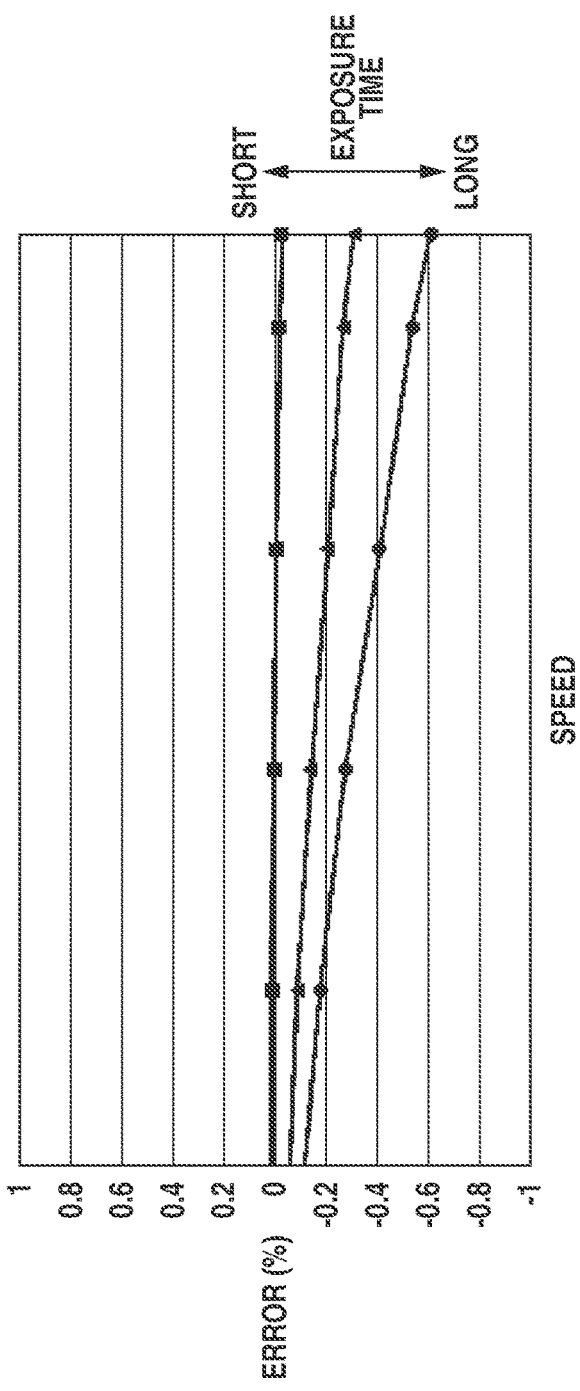
FIGS. 7A, 7B, and 7C are diagrams illustrating measurement results with changes in sensor exposure time.
Figure 7C:
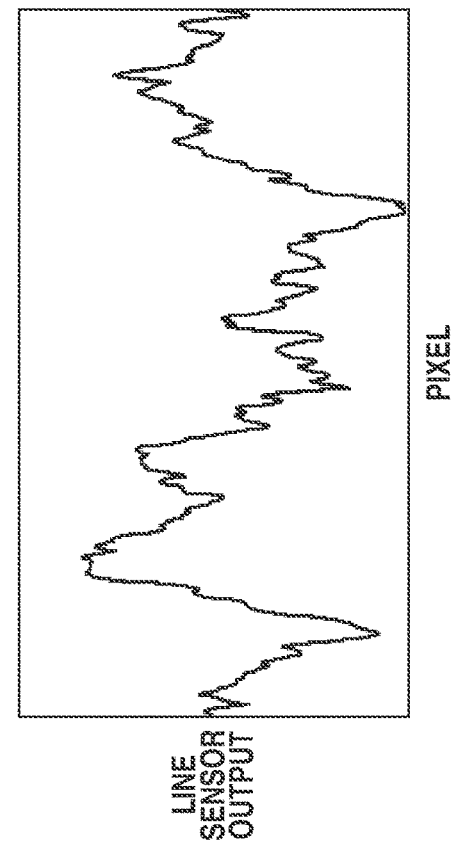
Figure 7B:
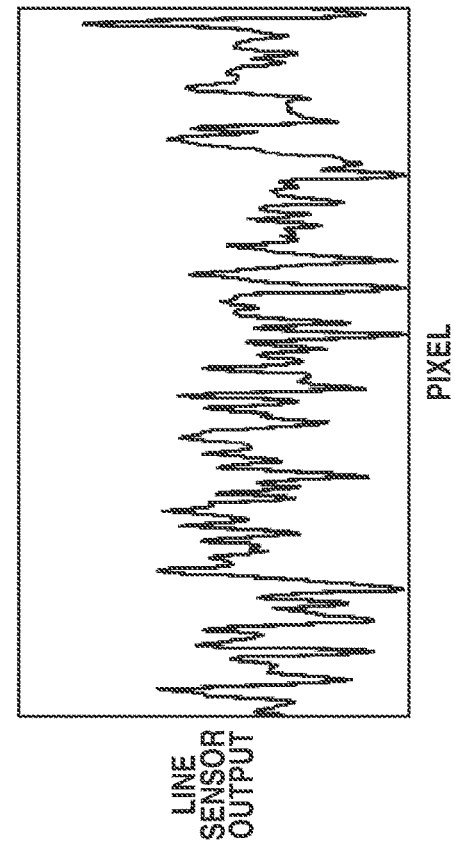

Setting of the exposure time of the sensor 6 will be described. FIGS. 7A to 7C illustrate results of simulations of a relationship between the exposure time of the sensor 6 and a measurement error. The simulation results have proved to match well with experimental results. FIG. 7A illustrates results of measurement of a metal sample with changes in the exposure time and the speed of the measurement target object, with the band-pass filter set as described above. The horizontal axis indicates the speed of the measurement target object, and the vertical axis indicates the measurement error. The higher the speed of the measurement target object and the longer the exposure time, the greater the error becomes. This indicates that the shake of the measurement target object caused deterioration of the measurement accuracy. FIGS. 7B and 7C illustrate line sensor outputs with different exposure times.

Figure 8A:
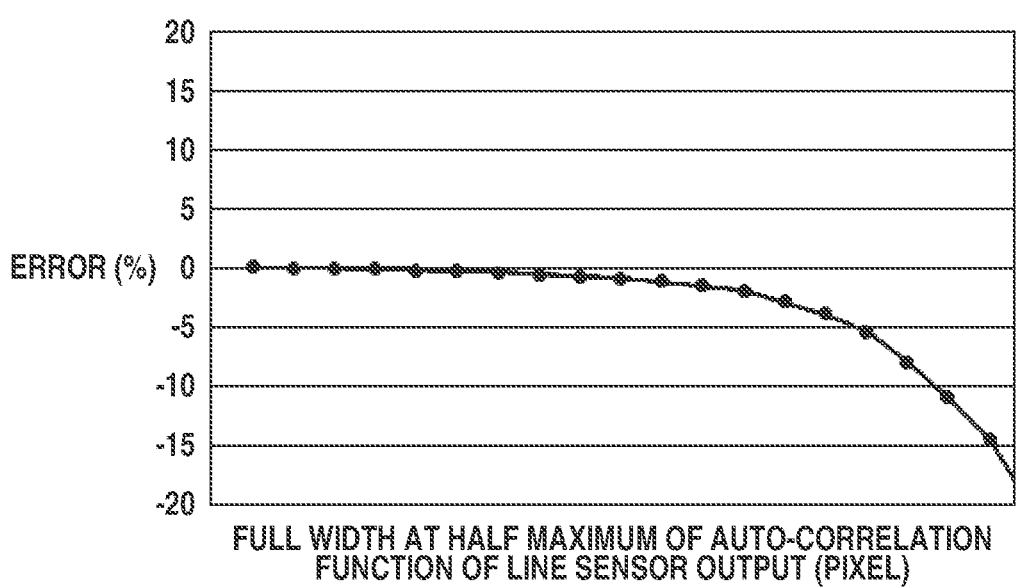

FIGS. 8A to 8D-2 illustrate results of simulations of a relationship between the spatial frequency of an image (pattern) obtained by imaging the measurement target object and the measurement accuracy. FIG. 8B-1 illustrates a line sensor output in a case where the spatial frequency of an image obtained by imaging the measurement target object is relatively high. FIG. 8B-2 illustrates an auto-correlation function of the line sensor output illustrated in FIG. 8B-1. FIGS. 8C-1 and 8D-1 illustrate line sensor outputs in a case where the spatial frequency is lower. FIGS. 8C-2 and 8D-2 illustrate auto-correlation functions of the line sensor outputs illustrated in FIGS. 8C-1 and 8D-1, respectively.

FIG. 8A illustrates a full width at half maximum of an auto-correlation function of a line sensor output on the horizontal axis and illustrates a measurement error obtained in the line sensor output on the vertical axis. For the spatial frequency components included in the line sensor output, in a case where the high-frequency component is dominant, the full width at half maximum of the auto-correlation function is small and high-accuracy measurement is enabled. However, in a case where the low-frequency component is dominant, the full width at half maximum of the auto-correlation function is large and the measurement error is large. The measurement results illustrated in FIGS. 7A to 7C match well with the relationship between the line sensor output and the measurement accuracy illustrated in FIGS. 8A to 8D-2.

As above, the exposure time may lead to the shake of the measurement target object, thereby causing the measurement error. Thus, it can be seen from the simulation and experimental results that the shake of the measurement target object causing accuracy deterioration can be suppressed by setting an exposure time E of the photoelectric conversion element array and an upper-limit measurement speed V (mm/s) of the measurement target object capable of being measured by the displacement meter as in the following inequality (5):

$$E \leq 0.05 \times (N \times P/(M \times V)) \quad (5)$$

In the inequality (5), N×P/(M×V) is a value of the exposure time obtained by dividing the converted length of all the pixels in the line sensor by the upper-limit measurement speed. That is, the exposure time of the sensor is set within 5% of N×P/(M×V). More desirably, the shake of the measurement target object causing the accuracy deterioration can be suppressed by setting the exposure time of the sensor to 1% to 5% of N×P/(M×V) as in the following inequalities (6):

$$0.01 \times (N \times P/(M \times V)) \leq E \leq 0.05 \times (N \times P/(M \times V)) \quad (6)$$

Setting the exposure time of the sensor as described above enables the accurate measurement of a wide variety of measurement target objects such as metals and paper. In a case where a measurement target object is specified, the exposure time can be further limited.

A specific example of configuration of the first exemplary embodiment will be described. If the magnification M of the light-receiving optical system is 0.5 times, the pixel pitch P is 10 (um), the number of pixels is 128, and the maximum measurement speed is 100 (mm/s), an upper limit of the exposure time E is 256 to 1280 (us). Setting the cut-off frequency of the high-pass filter to 1.2 to 3.9 (l/mm) and setting the cut-off frequency of the low-pass filter to 15.6 to 23.4 (l/mm) allow the accurate measurement of various measurement target objects.

Figure 9:
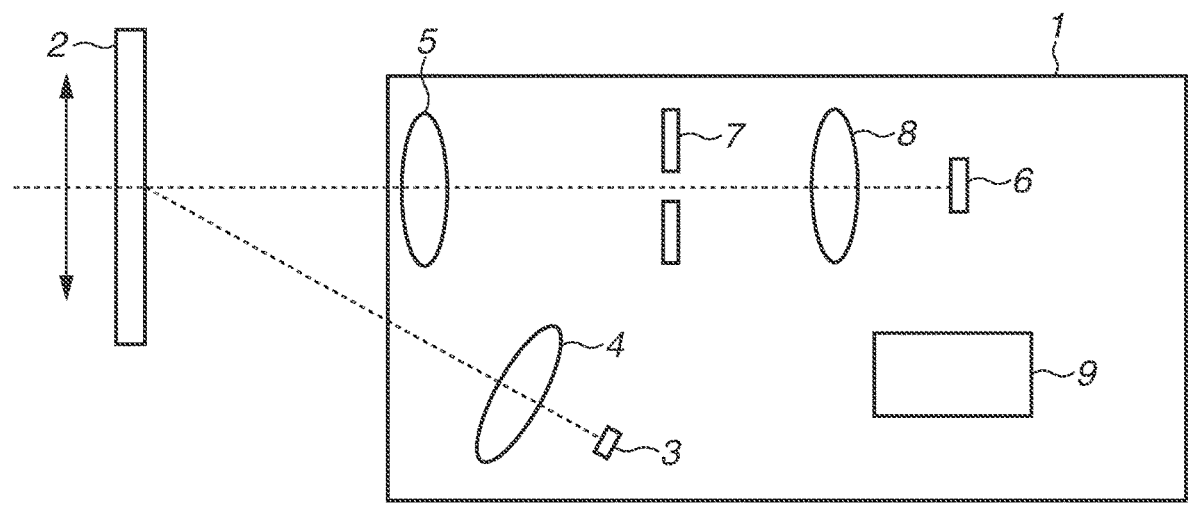
FIG. 9 is a diagram illustrating a configuration of a displacement meter according to a second exemplary embodiment.

FIG. 9 is a diagram illustrating a configuration of a length meter in a second exemplary embodiment. The light-receiving optical system in the first exemplary embodiment is the object-side telecentric optical system. With a change in the spacing between the displacement meter 1 and the object 2 as a measurement target object, the magnification of the optical system varies to affect the measurement accuracy. FIG. 9 illustrates a configuration of a double telecentric optical system. The double telecentric optical system is configured such that two light-condensing members 5 and 8 are used in the light-receiving optical system and an aperture 7 is placed to match respective focal points of the light-condensing members 5 and 8. The light-condensing members 5 and 8 each include a single lens element or a lens unit or device.

In this configuration, the magnification of the optical system is constant even with a change in a space between the displacement meter 1 and the object 2, and thus the measurement accuracy is constant. For example, a single lens element with a focal length f3 (mm) is adopted as the light-condensing member 5, a single lens element with a focal length f4 (mm) is adopted as the light-condensing member 8, and a fixed aperture with an opening of a diameter d (mm) is placed as the aperture 7 so as to match respective focal lengths of the light-condensing members 5 and 8. In this case, the magnification of the optical system is determined by a ratio between f3 and f4. If the size of the opening of the aperture 7 is small, a sharp image can be obtained even with a great change in the space from the object 2. However, the size of the opening in the aperture 7 can be determined as appropriate depending on the intended use, although there are trade-offs with the amount of acquirable light amount and the resolution of the light-receiving optical system.

Adopting this configuration with settings of the illumination system (the light source 3 and the light-condensing member 4) and the sensor similar to those in the first exemplary embodiment realizes a length meter that does not cause the accuracy deterioration even with a change in the space between the displacement meter 1 and the object 2 in comparison to the first exemplary embodiment.

According to the above-described exemplary embodiments, it is possible to provide a displacement meter that is capable of high-accuracy measurement of various measurement target objects while enabling easy parameter setting.

As above, the exemplary embodiments of the present disclosure have been described. However, the present disclosure is not limited to these exemplary embodiments and can be modified and changed in various ways without departing from the gist of the present disclosure. For example, in a case where the sensor 6 is a two-dimensional area sensor, the number N of pixels described above can be replaced with the number of pixels aligned in one direction of the two-dimensional area sensor.

A manufacturing method of an article (a metal sheet, a pressed object, paper, fibers, or the like) using the above-described displacement meter will be described. The article is manufactured through the steps of: conveying a conveyance object (target object) by a conveyance apparatus; measuring an amount of conveyance of the conveyance object as displacement by using the above-described displacement meter, and subjecting the conveyance object to processing such as cutting and pressing at a timing when a desired amount of conveyance is detected. Otherwise, the processing can be stopped upon detection of any divergence from a predetermined value of the amount of conveyance.

According to the article manufacturing method, it is possible to manufacture an article with higher quality than ever due to reduction in a measurement error of the displacement meter.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-076746, filed Apr. 28, 2021, which is hereby incorporated by reference herein in its entirety.

What is claimed is:

1. A displacement meter configured to measure displacement of a measurement target object, comprising:
   an illumination assembly configured to illuminate the measurement target object;
   a photoelectric conversion element array configured to detect reflected light from the measurement target object;
   a light-receiving optical assembly configured to condense light on the photoelectric conversion element array; and
   a calculation circuit configured to calculate a displacement amount of the measurement target object, using a cross-correlation function of a plurality of images detected at different timings by the photoelectric conversion element array,
   wherein the calculation circuit performs a Fourier transform on the images, applies a band-pass filter to the images having undergone the Fourier transform, and calculates the cross-correlation function using the images to which the band-pass filter has been applied, and
   wherein, assuming that a magnification of the light-receiving optical assembly is M, the number of pixels in the photoelectric conversion element array is N, and a pixel pitch is P (um), a low cut-off frequency HPF of the band-pass filter and a high cut-off frequency LPF of the band-pass filter satisfy:

$$3M/(N \times P) \leq \text{HPF} \leq 10M/(N \times P),$$

$$40M/(N \times P) \leq \text{LPF} \leq 60M/(N \times P).$$

2. The displacement meter according to claim 1, wherein, assuming that an exposure time of the photoelectric conversion element array is E, an upper-limit measurement speed of the measurement target object capable of being measured by the displacement meter is V (mm/s), $E \leq 0.05 \times (N \times P/(M \times V))$ is satisfied.

3. The displacement meter according to claim 2, wherein $0.01 \times (N \times P/(M \times V)) \leq E \leq 0.05 \times (N \times P/(M \times V))$ is satisfied.

4. The displacement meter according to claim 1, wherein the illumination assembly has an incoherent light source and a lens.

5. The displacement meter according to claim 1, wherein the photoelectric conversion element array is a line sensor, and the number N of pixels in the photoelectric conversion element array is the number of pixels in the line sensor.

6. The displacement meter according to claim 1, wherein the photoelectric conversion element array is a two-dimensional area sensor, and the number N of pixels in the photoelectric conversion element array is the number of pixels aligned in one direction in the area sensor.

7. The displacement meter according to claim 1, wherein the light-receiving optical assembly is an object-side telecentric optical assembly.

8. The displacement meter according to claim 1, wherein the light-receiving optical assembly is a double telecentric optical assembly.

9. An article manufacturing method comprising:
   measuring a displacement amount of a target object using the displacement meter according to claim 1; and
   processing the target object based on the measured displacement amount.

* * * * *